(12) United States Patent
Mashkin et al.

(10) Patent No.: US 11,703,181 B2
(45) Date of Patent: Jul. 18, 2023

(54) CONTROL SYSTEM FOR ADJUSTING THE TEMPERATURE OF BEARING OIL FOR THE PURPOSE OF MINIMIZING ROTOR VIBRATIONS

(71) Applicant: Siemens Aktiengesellschaft, Munich (DE)

(72) Inventors: Andrey Mashkin, Cologne (DE); Robin Burzan, Mülheim an der Ruhr (DE); Sebastian Zahn, Karlsruhe (DE); Gerta Zimmer, Mülheim an der Ruhr (DE); Esteban Grau Sorarrain, Düsseldorf (DE); Alexander Münnekhoff, Essen (DE); Florian Röhr, Mülheim an der Ruhr (DE); Christian Jäkel, Duisburg (DE); Matthias Kowalski, Mülheim an der Ruhr (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 618 days.

(21) Appl. No.: 16/644,427

(22) PCT Filed: Aug. 9, 2018

(86) PCT No.: PCT/EP2018/071655
§ 371 (c)(1),
(2) Date: Mar. 4, 2020

(87) PCT Pub. No.: WO2019/048177
PCT Pub. Date: Mar. 14, 2019

(65) Prior Publication Data
US 2020/0256393 A1 Aug. 13, 2020

(30) Foreign Application Priority Data
Sep. 7, 2017 (DE) .................... 10 2017 215 767.4

(51) Int. Cl.
*F16N 7/38* (2006.01)
*F01M 5/00* (2006.01)

(52) U.S. Cl.
CPC ............... *F16N 7/38* (2013.01); *F01M 5/005* (2013.01); *F16N 2210/02* (2013.01); *F16N 2270/56* (2013.01)

(58) Field of Classification Search
CPC .... F16N 7/38; F16N 2210/02; F16N 2270/56; F01M 5/005
(Continued)

(56) References Cited

U.S. PATENT DOCUMENTS 3,124,395 A * 3/1964 Sternlicht ............... F16C 33/10
384/114
4,643,592 A * 2/1987 Lewis ................... F16C 17/028
384/114

(Continued)

FOREIGN PATENT DOCUMENTS

DE 4404301 A1 8/1995
JP 2005113805 A 4/2005
RU 2498096 C2 11/2013

OTHER PUBLICATIONS

PCT International Examination Report and Written Opinion of International Examination Authority dated Nov. 29, 2018 corresponding to PCT International Application No. PCT/EP2018/071655 filed Aug. 9, 2018.

*Primary Examiner* — Gene O Crawford
*Assistant Examiner* — Emily R Kincaid
(74) *Attorney, Agent, or Firm* — Henry M. Feiereisen LLC

(57) ABSTRACT

The invention relates to a control system for reducing rotor vibrations, in particular the variability thereof, in shafting, in particular turbine shafting, in which the temperature of the bearing (6) of the shaft is measured and the oil (8) supplied (Continued)

to the bearing is adjusted to a temperature as is assigned as the output variable in an allocation for minimised rotor vibrations with the measured temperature of the bearing as the input variable. The allocation can, for example, be provided by an initial measurement of the rotor vibrations or by a self-learning system. According to the invention, the variability of the rotor vibrations is restricted.

11 Claims, 2 Drawing Sheets

(58) Field of Classification Search
USPC .......................................................... 384/317
See application file for complete search history.

(56) References Cited

U.S. PATENT DOCUMENTS

| | | | |
|---|---|---|---|
| 5,099,966 A * | 3/1992 | Wohrl | F16F 9/52 |
| | | | 188/322.5 |
| 5,971,107 A | 10/1999 | Stitz et al. | |
| 2011/0198155 A1 | 8/2011 | Snecma et al. | |
| 2012/0006622 A1* | 1/2012 | Will | F01M 5/001 |
| | | | 184/6.22 |
| 2013/0213001 A1* | 8/2013 | Eickelkamp | F16N 39/02 |
| | | | 60/39.08 |
| 2016/0061071 A1* | 3/2016 | Lee | F01M 5/005 |
| | | | 184/6.1 |
| 2018/0245632 A1 | 8/2018 | Obara et al. | |

* cited by examiner

CONTROL SYSTEM FOR ADJUSTING THE TEMPERATURE OF BEARING OIL FOR THE PURPOSE OF MINIMIZING ROTOR VIBRATIONS

CROSS-REFERENCES TO RELATED APPLICATIONS

This application is the U.S. National Stage of International Application No. PCT/EP2018/071655 filed Aug. 9, 2018, which designated the United States and has been published as International Publication No. WO 2019/048177 A1 and which claims the priority of German Patent Application, Serial No. 10 2017 215 767.4, filed Sep. 7, 2017, pursuant to 35 U.S.C. 119(a) (d).

BACKGROUND OF THE INVENTION

The invention relates to a control system for reducing the rotor vibrations, in particular the variability thereof, in shafting, in particular turbine shafting.

In generator bearings (and other bearings in turbine shafting), lubricating oil is used to enable largely low-loss rotation of the rotating components. The bearing lubricating oil is conveyed toward the bearing through a three-way mixing valve 1. A lubricating oil flows into this mixing valve out of the oil cooler 3 and lubricating oil flows out of a bypass to this oil cooler. The reason for this mixing valve consists in achieving a control temperature of 46° C. during normal operation for instance. As soon as the cooling power is not sufficient to ensure this temperature under the given environmental conditions, higher temperatures develop. This state is often achieved in particular in hot environments, and so the bearing is configured for the maximum temperature that develops. A maximum temperature of 55° C. is currently often required. This results in the temperature being able to fluctuate between 46° C. and 55° C. during operation. The developing problem here is that on account of the temperature variation the bearing oil has different viscosity values. The viscosity is very temperature dependent; see FIG. 1.

The change in viscosity entails a change in the stiffness and damping properties of the oil film and thus the dynamic properties (natural frequencies and damping factors) of shafting. This variability in the dynamic properties is currently not taken into consideration in rotor-dynamic calculations. In this way significant additional effort in terms of engineering and increased product costs would arise, since instead of individual natural frequencies and damping factors, natural frequency bands and damping factor bands have to be taken into consideration in the design. This is illustrated in FIG. 2, for instance, using a mode of an examined single shafting. The natural frequency of the mode changes in the range of the lubricating oil supply temperature by 1.4 Hz, the damping factor D by 0.9%. This represents a rotor-dynamic relevant variability in the dynamic behavior of the system, which can result in increased vibrations. In view of more stringent requirements on the part of the plant operator with respect to the vibration quality to be guaranteed by the manufacturer (original equipment manufacturer, OEM), it is desirable to limit the vibrations.

The problem underlying the invention is to reduce the variability of the dynamic properties, in particular of the natural frequencies and damping factors of the shafting.

SUMMARY OF THE INVENTION

The problem is achieved by a control system for reducing the rotor vibrations, in particular the variability thereof, in shafting, in particular turbine shafting, wherein the temperature of the bearing of the shaft is measured; the oil supplied to the bearing is adjusted to a temperature as is assigned as the output variable in an allocation for minimized rotor vibrations with the measured temperature of the bearing (6) as the input variable.

The invention provides for the use of an active controller, which adjusts the bearing oil temperature with the aid of a valve, to a bypass, so that the rotor vibrations are at a minimum.

The bearing temperature and the shaft vibrations are measured. The data is evaluated and an algorithm is used to calculate the optimal bearing oil temperature for the purpose of minimizing vibration. This temperature is now adjusted with the aid of a control valve (bypass) and the oil cooler.

This controller is intended to obtain information about the operating regime and, by comparison with historical data at the same operating points, to perform control activities in a predictive and self-learning manner. Damping at an early stage is thus enabled and the inertia of the system (valve control time) is compensated.

The bearing lubricating oil supply temperature is controlled during normal operation so that the same dynamic properties of the shafting are always present. This frequently has a positive influence on the vibration behavior. The fluctuations in the natural frequencies and dampings mentioned in the introduction are limited. In the case considered above, this means that the rotor-dynamic behavior calculated for the maximum bearing lubricating oil supply temperature is always present during normal operation, disregarding other calculation uncertainties and variabilities. In the design phase, the shafting can therefore be optimized precisely to the state that will subsequently be present. The resulting improvement in the vibration behavior produces a competitive advantage.

Advantageous developments of the invention are specified in the subclaims.

BRIEF DESCRIPTION OF THE DRAWING

The invention is explained in more detail below as an exemplary embodiment using figures to the extent required for understanding. In the drawings.

DETAILED DESCRIPTION OF PREFERRED EMBODIMENTS

Figure 1:
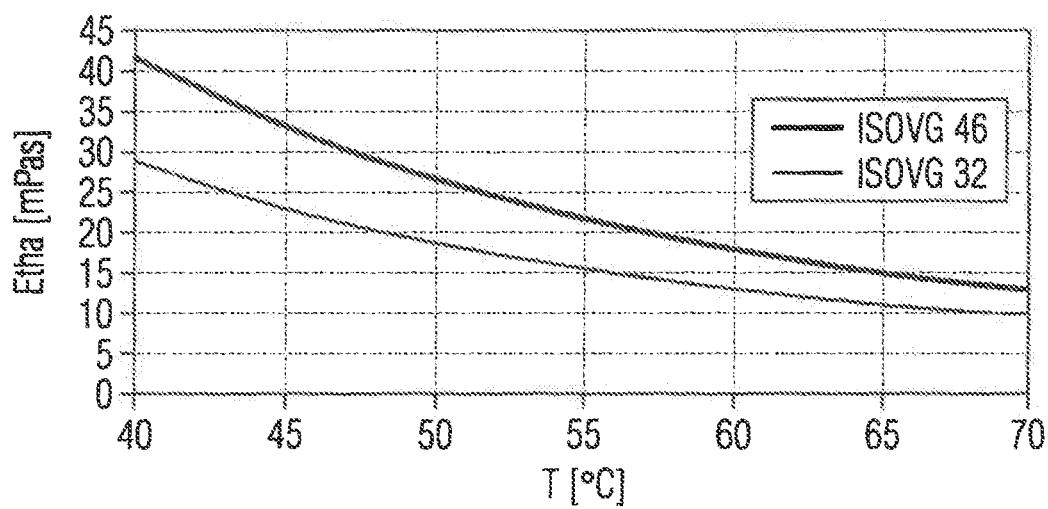
FIG. 1 shows the temperature dependency of the dynamic viscosity etha for typical viscosity grades.

In the figures, like reference characters denote like elements.

FIG. 1 shows a graphic representation of the dynamic viscosity equation after rust for the viscosity grades ISOVG 32 (lower line) and ISOVG 46 (upper line).

Figure 2:
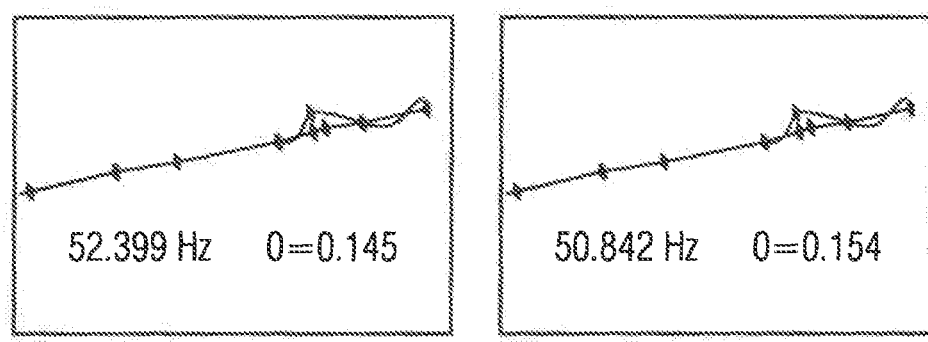
FIG. 2 shows the dynamic behavior of a single-shaft system for different lubricating oil supply temperatures.

FIG. 2 shows the calculated dynamic behavior of a single-shaft system with a lubricating oil of the viscosity grade ISOVG 32, in the left diagram with a lubricating oil supply temperature of 46° C. and in the right diagram with a lubricating oil supply temperature of 56° C.

Figure 3:
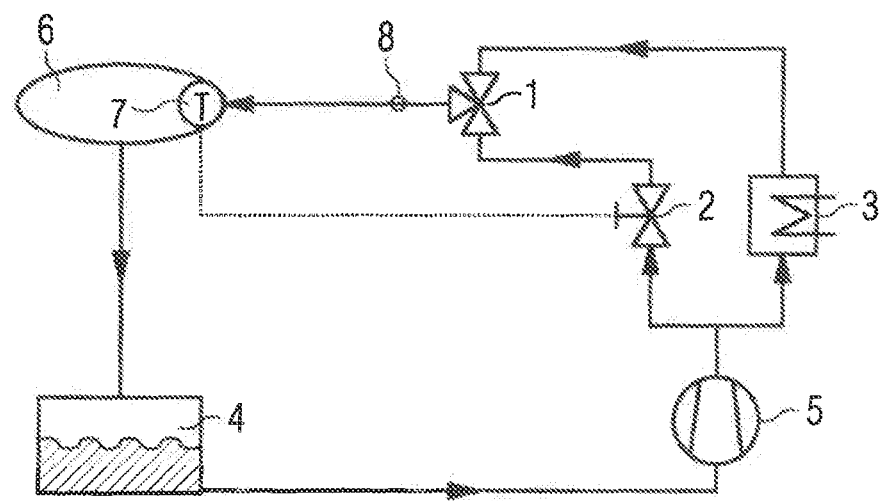
FIG. 3 shows a temperature-controlled lubricating oil circuit which realizes the invention

The oil circuit shown in FIG. 3 comprises a bearing 6, a bearing oil tank 4, a pump 5, an oil cooler 3, a bypass, having a valve 2, to the oil cooler and a mixing valve 1 which combines the output of the oil cooler and the bypass. The temperature of the bearing 6, which acts as a heat source, is measured by means of a temperature sensor 7.

The temperature 8 of the oil supplied to the bearing is adjusted with the aid of the valve 2.

The oil supplied to the bearing is adjusted to a temperature level 8 as is stored as the output variable in an allocation table for minimized rotor vibrations with the measured temperature of the bearing as the input variable.

The present invention has been explained in detail for illustration purposes on the basis of specific exemplary embodiments. Here elements of the individual exemplary embodiments can also be combined with one another. The invention should therefore not be restricted to individual exemplary embodiments but should only be restricted by the appended claims.

The invention claimed is:

1. A control system for reducing rotor vibrations in a system, in particular a variability thereof, in a shafting, in particular a turbine shafting, said control system configured to:
   measure a temperature of a bearing of a shaft;
   adjust a temperature of oil supplied to the bearing to a temperature as assigned as an output variable in an allocation for minimized rotor vibrations with the measured temperature of the bearing as the input variable;
   a valve configured to adjust the temperature of the oil supped to the bearing, with the valve and the bearing being part of an oil circuit;
   a mixing valve configured to combine an output of an oil cooler and a bypass of the oil circuit, with the bypass bypassing the oil cooler and connected to the mixing valve, said valve being disposed in the bypass;
   for initial assignment with different temperatures of the bearing,
   measuring the rotor vibrations,
   calculating the respective oil temperatures of the bearing for minimizing the rotor vibrations,
   storing the respective oil temperatures of the bearing as input variables, and
   storing the associated calculated bearing oil temperatures as output variables in the assignment; and
   obtaining empirical values from an operating history of the shafting, and storing the empirical values in the assignment as output variables, so that damping at an early stage is enabled and inertia of the system is compensated.

2. The control system of claim 1, wherein the assignment is provided by a self-learning system.

3. The control system of claim 1, wherein the assignment is provided by a neural network.

4. The control system of claim 1, wherein the assignment is provided by a signal processor.

5. The control system of claim 1, wherein the bearing is a generator bearing.

6. A method for reducing rotor vibrations in a system, in particular a variability thereof, in a shafting, in particular a turbine shafting, said method comprising:
   measuring a temperature of a bearing of a shaft; and
   adjusting a temperature of oil supplied to the bearing to a temperature as assigned as an output variable in an allocation for minimized rotor vibrations with the measured temperature of the bearing as the input variable, wherein the temperature of the oil supplied to the bearing is adjusted by a valve, with the valve and the bearing being part of an oil circuit;
   further comprising combining an output of an oil cooler and a bypass of the oil circuit, with the bypass bypassing the oil cooler and connected to the mixing valve and the valve being disposed in the bypass;
   for initial assignment with different temperatures of the bearing,
   measuring the rotor vibrations,
   calculating the respective oil temperatures of the bearing for minimizing the rotor vibrations,
   storing the respective oil temperatures of the bearing as input variables, and
   storing the associated calculated bearing oil temperatures as output variables in the assignment; and
   obtaining empirical values from an operating history of the shafting, and storing the empirical values in the assignment as output variables, so that damping at an early stage is enabled and inertia is compensated.

7. The method of claim 6, wherein the assignment is provided by a selflearning system.

8. The method of claim 6, wherein the assignment is provided by a neural network.

9. The method of claim 6, wherein the assignment is provided by a signal processor.

10. An oil circuit in a system, in particular a variability thereof, in a shafting, in particular a turbine shafting, the oil circuit comprising:
    a bearing for support of a shaft;
    a bearing oil tank;
    a pump supply oil from the bearing oil tank to the bearing;
    an oil cooler;
    a bypass bypassing the oil cooler and having a valve configured to adjust a temperature of the oil supplied to the bearing;
    a mixing valve fluidly connected to the oil cooler and the bypass to combine an output of the oil cooler and the bypass;
    a control system for reducing rotor vibrations, said control system configured to measure the temperature of the bearing, and to adjust a temperature of oil supplied to the bearing to a temperature as assigned as an output variable in an allocation for minimized rotor vibrations with the measured temperature of the bearing as the input variable;
    for initial assignment with different temperatures of the bearing,
    measuring the rotor vibrations,
    calculating the respective oil temperatures of the bearing for minimizing the rotor vibrations,
    storing the respective oil temperatures of the bearing as input variables, and
    storing the associated calculated bearing oil temperatures as output variables in the assignment; and
    obtaining empirical values from an operating history of the shafting, and storing the empirical values in the assignment as output variable, so that damping at an early stage is enabled and inertia of the system is compensated.

11. The oil circuit of claim 10, wherein the bearing is a generator bearing.

* * * * *

UNITED STATES PATENT AND TRADEMARK OFFICE
CERTIFICATE OF CORRECTION

| | |
|---|---|
| PATENT NO. | : 11,703,181 B2 |
| APPLICATION NO. | : 16/644427 |
| DATED | : July 18, 2023 |
| INVENTOR(S) | : Andrey Mashkin et al. |

It is certified that error appears in the above-identified patent and that said Letters Patent is hereby corrected as shown below:

In the Claims

In Column 3, Claim 1, Line 27: correct "supped" to read --supplied--.

Signed and Sealed this
Nineteenth Day of September, 2023

Katherine Kelly Vidal
*Director of the United States Patent and Trademark Office*